United States Patent Office 3,210,344
Patented Oct. 5, 1965

3,210,344
PROCESS FOR MAKING β-[2-(5-SUBSTITUTED) FURYL] PROPIONIC ACID ESTERS AND THE COMPOUNDS PRODUCED THEREBY
Klaus Thewalt, Witten (Ruhr), Germany, assignor to Chemische Werke Witten G.m.b.H., Witten (Ruhr), Germany
No Drawing. Filed Aug. 22, 1962, Ser. No. 218,504
Claims priority, application Germany, Sept. 4, 1961, C 24,993
13 Claims. (Cl. 260—240)

The present invention relates to a process for the preparation of β[2-(5-substituted) furyl] propionic acid esters by cleavage of β-furfurylidene ketones in the absence of water and the compounds produced thereby.

A cleavage of the furan ring in β-furfurylidene ketones has been described by Kehrer and Igler in Ber. 32, 1176 (1899), but Kehrer and Igler conducted their cleavage in the presence of water, concentrated hydrochloric acid and alcohol and thereby obtained an addition or accumulation of 2 moles of water while the ω-substituted heptanedione-(4,7)-dioic acid esters and, respectively, their acids were formed.

It has now been found that β[2-(5-substituted) furyl] propionic acid esters of the general formula

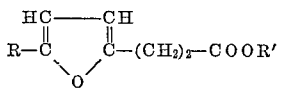

wherein R is a $C_6H_5$—, $CH_3$—, or $C_6H_5$—CH=CH— group and R' designates an aliphatic primary alcohol residue, may be prepared in a simple manner by splitting β-furfurylidene ketones of the general formula

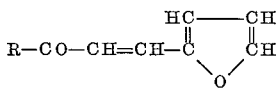

wherein R has the above-indicated significance, with excess amounts, preferably the triple to quadruple amount, of water-free, monohydric, saturated aliphatic alcohols with up to 8 carbon atoms in the presence of dry, purified acids, preferably gaseous HCl, in amounts of 0.5 up to 5%, preferably in amounts of 1–2% and at temperatures of between 70 and 120° C., preferably of from 100–110° C., in an inert atmosphere, such as nitrogen, with the addition of hydroquinone or other antioxidants in amounts of 0.1–1%, and more particularly in amounts of 0.6–1%, expediently while stirring and separating by distillation the resulting carboxylic acid esters which are rendered impure by non-reacted starting material of the general formula

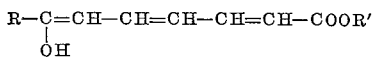

The reaction may also be carried out in a sealed tube at temperatures of from 200–250° C. The higher temperature may be utilized due to the exclusion of air and thus the prevention of oxidation reactions. The reaction time may be shortened in relation to the temperature increase. The advantages of the sealed tube are, however, limited, since such tubes are relatively small.

As β-furfurylidene ketones, β-furyl-acrylophenone, furfural acetone and benzylidene furfurylidene acetone, for example, may be used.

As monohydric saturated aliphatic alcohols, methanol, propanol, butanol, heptanol, etc., may be used.

The present invention, accordingly, has as its principle object, the production of β[2-(5-substituted) furyl] propionic acid esters.

Other objects will become apparent as the description proceeds.

The β-furfurylidene ketones of the above-mentioned type are, according to the present invention, dissolved in excess amounts of absolute, monohydric, saturated aliphatic alcohols, which have been previously reacted, for example, with 1–1.5% gaseous, dried hydrochloric acid, and heated in a nitrogen atmosphere in the presence of hydroquinone for 5–7 hours while stirring. If necessary, another inert solvent, such as benzene, chloroform, and methylene chloride, may also be used. The duration of heating and the temperature depend upon the species or variety of the alcohol used. In order to avoid an air oxidation, it may be advantageous, particularly for the reaction of smaller amounts to work in the sealed tube as mentioned above.

The esters produce according to the present invention are obtained, in addition to non-reacted starting material, by the subsequent distillation. When the resulting esters, according to the present invention, contain a phenyl residue in the 5-position, and when an effective fractionation is impossible due to the close boiling points, purification and removal of the non-reacted starting material may be achieved by hydration thereof with any type of nascent hydrogen (Na/alcohol, and, respectively, Zn/Hg) or with Raney nickel in an autoclave at 15–30 atmospheres, preferably 20–25 atmospheres, and at temperatures of from 70–120° C., preferably from 90–110° C. During such an operation, the starting product present as impurity will be hydrated to lower boiling constituents which may be then easily separated from the esters by distillation.

It is possible to produce other compounds from the carboxylic esters prepared according to the present invention, in a manner known in the art, for example, β[2-(5-substituted) furyl] propionic acid. In addition, they may be utilized as starting materials for the preparation of any other derivatives of the acids on which the esters of the present invention are based. The products prepared or produced according to the present invention also serve as intermediate products in polymerization and polycondensation reactions.

The following examples serve to illustrate the present invention, without limiting the same.

Example I 230 g. β-furyl-acrylophenone are stirred in 750 g. 1.5% HCl containing absolute n-butanol while introducing $N_2$ in the presence of 0.8% of hydroquinone for 7 hours at 100° C. After distillation of the excess butanol, the main amount of the non-reacted β-furyl-acrylophenone is distilled in vacuo at 2 mm. to 168° C. (100 g.). At 170–175° C. (2 mm.), 130 g. of the yellow-colored butyl ester additionally pass over.

Example II 300 g. β[2-5(phenyl) furyl] propionic acid butyl ester are hydrated with 300 cc. methanol and 1 g. Raney nickel in an autoclave at 22 atmospheres' hydrogen and 100° C. to the end of the hydrogen absorption. After distillation of the methanol, the residue is fractionated in an oil pump vacuum over a small Vigreux column. Thereby, 8–10 g. of a colorless preliminary run (boiling point 80–150° C.) are obtained, while 270 g. of the pure, greenish-yellow butyl ester come over at a boiling point of 178–180° C. Saponification with alcoholic KOH yields the corresponding carboxylic acid. The melting point of the product is 116° to 117° C. and consists of needles having a water-white with a lightly greenish coloration."

Example III 400 g. of β-furyl-acrolophenone are stirred in 2 liters of absolute iso-octanol containing 2% water-free p-toluene-sulfonic acid while introducing $N_2$ in the presence of 0.8% hydroquinone for 10 hours at 100–110° C. After distillation of the excess octanol in a water jet vacuum, the main amount of the non-reacted β-furyl-acrylophenone is distilled off in vacuo at 2 mm. up to 168° C. (210 g.). Between 138–140° C. (0.2 mm.), an additional 180 g. of the deeply yellow-colored iso-octanol ester pass over.

Example IV 330 g. furfural acetone are stirred in 800 cc. absolute butanol, containing 1% HCl, while introducing $CO_2$ in the presence of 1% pyrogallol for 6 hours at 85–95° C. After distillation of the excess butanol, most favorably in a water jet vacuum, 80 g. of the non-reacted furfural acetone are distilled off between 75–77° C. (1.5 mm.), while at between 132–135° C. (1.5 mm.), 30 g. of the yellow butyl ester pass over. The residue is a solid, insoluble, black mass.

Example V 60 g. benzylidene furfurylidene acetone are dissolved in 240 ml. of absolute butanol and 50 ml., dried $CHCl_3$ and added drop-wise during 3 hours at 100° C. while stirring at 330 ml. of absolute butanol containing 1.8% HCl, dried at a high temperature. After another 3–4 hours, the butanol and the hydrochloric acid are removed at 15 Torr, and the black, oily residue distilled at as low as possible a pressure. Thereby, only the deeply yellow-colored butyl ester passes over in a yield which is 23% of the theoretical (18 g.) between 191–192° C. and 0.8 Torr, while the starting ketone changes very rapidly into a brittle, resinous mass.

While I have described my invention with reference to the above discussion and examples, it will be understood that I do not wish to be limited thereto since many modifications may be made by one skilled in the art within the scope of the invention, and I intend to include all such modifications which come within the scope of the appended claims.

I claim:

1. A process for the preparation of β-[2-(5-substituted furyl] propionic acid esters of the general formula

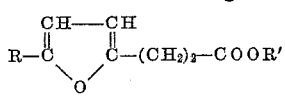

wherein R is a radical selected from the group consisting of $C_6H_5$—, $CH_3$—, and $C_6H_5$—CH=CH— and R' is an aliphatic primary alcohol residue, comprising cleaving a β-furfurylidene ketone of the general formula

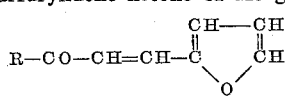

wherein R has the above-indicated meaning, with an excess amount of a water-free, monohydric, saturated, aliphatic alcohol of up to 8 carbon atoms in the presence of between approximately 0.5 and 5% of a dry, purified acid at an effective elevated temperature, and thereafter separating the resulting carboxylic acid ester product from the reaction mixture.

2. A process in accordance with claim 1, wherein the cleavage is conducted in an inert atmosphere and in the presence of between approximately 0.1 to 1.0% of an antioxidant.

3. A process in accordance with claim 2, wherein the insert atmosphere is nitrogen and the antioxidant is hydroquinone.

4. A process in accordance with claim 1, wherein the resulting carboxylic acid ester product is separated from the reaction mixture by distillation.

5. A process in accordance with claim 1, wherein the β-furfurylidene ketone is selected from the group consisting of β-furyl-acrylophenone, furfural acetone, and benzylidene furfurylidene acetone.

6. A process in accordance with claim 1, wherein the cleavage is conducted at a temperature of from approximately 70° to 120° C.

7. A process in accordance with claim 1, wherein R is a phenyl group and wherein, prior to the separation step, the unreacted starting material in the resulting reaction mixture is hydrated by treating the same with a compound selected from the group consisting of nascent hydrogen and Raney nickel in an autoclave at a pressure of between approximately 15 and 30 atmospheres and a temperature of approximately 70° to 120° C.

8. A process for the preparation of β-[2-(5 substituted) furyl] propionic acid esters of the general formula

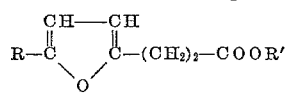

wherein R is a radical selected from the group consisting of $C_6H_5$—, $CH_3$—, and $C_6H_5$—CH=CH— and R' is an aliphatic primary alcohol residue, comprising dissolving a β-furfurylidene ketone of the general formula

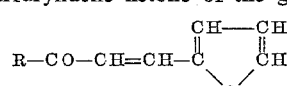

wherein R has the above-indicated meaning, with an excess amount of a water-free, monohydric, saturated, aliphatic alcohol of up to 8 carbon atoms in the presence of between 0.5 and 5% of a dry, purified acid, heating the solution thereof to an effective elevated temperature, and thereafter separating the resulting carboxylic and ester product from the reaction mixture.

9. A process in accordance with claim 8, wherein an inert solvent selected from the group consisting of benzene, chloroform, and methylene chloride is also used to dissolve the β-furfurylidene ketone.

10. A process for the preparation of β-[2-(5-substituted furyl] propionic acid esters of the general formula

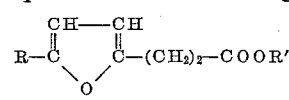

wherein R is a radical selected from the group consisting of $C_6H_5$—, $CH_3$—, and $C_6H_5$—CH=CH— and R' is an aliphatic primary alcohol residue, comprising cleaving a β-furfurylidene ketone of the general formula

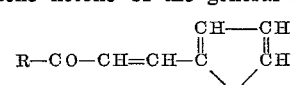

wherein R has the above-indicated meaning, with an excess amount of a water-free, monohydric, saturated, aliphatic alcohol of up to 8 carbon atoms in the presence of between 1 and 2% of dry, purified HCl at a temperature of between approximately 100° and 110° C. in the presence of an inert atmosphere and between approximately 0.1 and 1% of an antioxidant, and thereafter separating the resulting carboxylic acid ester product from the reaction mixture.

11. A process for the preparation of β-[2-(5-substituted) furyl] propionic acid esters of the general formula

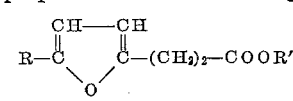

wherein R is a radical selected from the group consisting of $C_6H_5$—, $CH_3$—, and $C_6H_5$—CH=CH— and R' is an aliphatic primary alcohol residue, comprising cleaving a β-furfurylidene ketone of the general formula

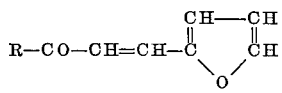

wherein R has the above-indicated meaning, with an excess amount of a water-free, monohydric, saturated, aliphatic alcohol of up to 8 carbon atoms in the presence of between approximately 0.5 and 5% of a dry, purified acid at a temperature of between approximately 200° and 250° C. in a sealed tube in an inert atmosphere and in the presence of between approximately 0.1 and 1% of an antioxidant, and thereafter separating the resulting carboxylic acid ester product from the reaction mixture.

12. β-[2-(5-phenyl) furyl] propionic acid isooctyl ester.
13. β-[2-(5-styryl) furyl] propionic acid butyl ester.

References Cited by the Examiner
FOREIGN PATENTS
1,278,631  11/61  France.

OTHER REFERENCES

Blicke et al. J. Am. Chem. Soc., vol. 66, page 1677 (1944).

Chemical Abstracts, vol. 49, col. 6904 (1955) (abstract of Yamashita et al., J. Chem. Soc. Japan, Indust. Chem. Section, vol. 56, pages 811–14 (1953)).

Chemical Abstracts Decennial Index (1947 to 1956) page 5403 s of subject index under 2-furanpropionic acid (1960).

Dunlop et al., "The Furans," pages 48, 52, 590 to 591, 653 to 658, 674 to 679 and 686 to 690, Reinhold Publishing Corp. (1953).

Robinson et al. J. Chem. Soc., 1939, pages 1743 to 1747.

Turner, J. Am. Chem. Soc., vol. 71, pages 612 to 615 (1949).

WALTER A. MODANCE, *Primary Examiner.*
JOHN D. RANDOLPH, *Examiner.*